United States Patent
Kim et al.

(10) Patent No.: US 8,718,679 B2
(45) Date of Patent: May 6, 2014

(54) METHOD FOR BROADCASTING AND METHOD FOR RECEIVING LOCATION INFORMATION OF BASE STATION

(75) Inventors: Won-Ik Kim, Daejeon (KR); Sung-Geun Jin, Daejeon (KR); Sung Cheol Chang, Daejeon (KR); Kwang Jae Lim, Daejeon (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 13/060,803

(22) PCT Filed: Aug. 28, 2009

(86) PCT No.: PCT/KR2009/004829
§ 371 (c)(1),
(2), (4) Date: Feb. 25, 2011

(87) PCT Pub. No.: WO2010/027164
PCT Pub. Date: Mar. 11, 2010

(65) Prior Publication Data
US 2011/0153430 A1  Jun. 23, 2011

(30) Foreign Application Priority Data

Sep. 3, 2008  (KR) .................. 10-2008-0086656
Jul. 17, 2009  (KR) .................. 10-2009-0065523

(51) Int. Cl.
*H04M 11/10* (2006.01)
*H04W 24/00* (2009.01)

(52) U.S. Cl.
USPC ............... 455/456.3; 455/404.2; 455/456.1

(58) Field of Classification Search
USPC ............ 455/456.3, 436, 456.1, 440; 370/331
See application file for complete search history.

(56) References Cited

U.S. PATENT DOCUMENTS

| | | | |
|---|---|---|---|
| 7,257,410 B2 | 8/2007 | Chun et al. | |
| 7,319,878 B2 * | 1/2008 | Sheynblat et al. | 455/456.3 |
| 7,720,487 B2 | 5/2010 | Kim et al. | |
| 7,809,379 B2 * | 10/2010 | Kim | 455/456.3 |
| 8,045,996 B2 * | 10/2011 | Brunner et al. | 455/456.1 |
| 2005/0107085 A1 * | 5/2005 | Ozluturk | 455/439 |
| 2006/0121914 A1 | 6/2006 | Kim et al. | |
| 2009/0213812 A1 * | 8/2009 | Park et al. | 370/331 |

FOREIGN PATENT DOCUMENTS

| | | |
|---|---|---|
| EP | 1 610 576 A2 | 12/2005 |
| EP | 1 655 908 A1 | 5/2006 |
| KR | 2001-0094595 A | 11/2001 |
| KR | 2005-0023702 A | 3/2005 |
| KR | 10-2005-0052172 A | 6/2005 |
| KR | 2006-0063623 A | 6/2006 |
| KR | 2006-0121137 A | 11/2006 |
| WO | 2005/050965 A1 | 6/2005 |
| WO | 2008/048007 A1 | 4/2008 |

\* cited by examiner

*Primary Examiner* — Nizar Sivji
(74) *Attorney, Agent, or Firm* — Jefferson IP Law, LLP

(57) ABSTRACT

A plurality of location-based service advertisement messages including location information of base stations belonging to each network are broadcasted with different timing in multiple wireless networks. Therefore, a terminal receives only at least on location-based service advertisement message corresponding to an accessible network among the plurality of location-based service advertisement messages.

14 Claims, 3 Drawing Sheets

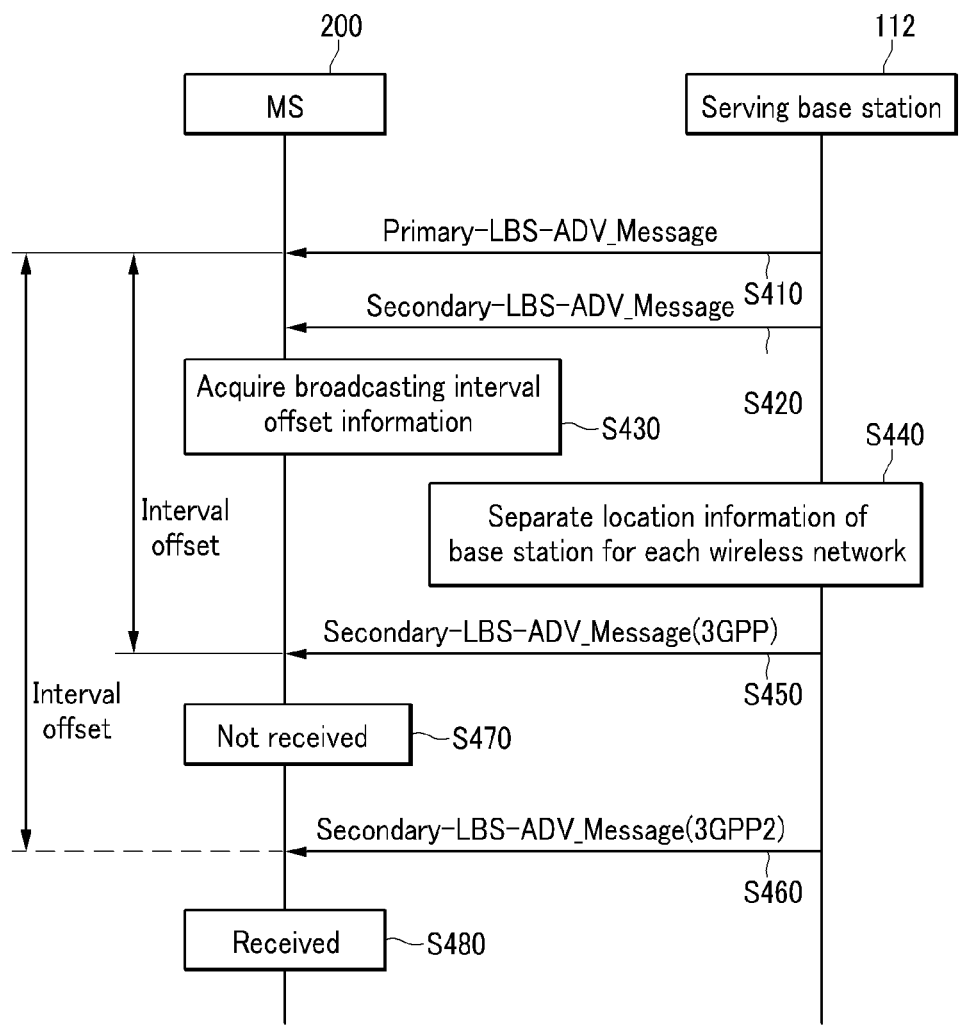

METHOD FOR BROADCASTING AND METHOD FOR RECEIVING LOCATION INFORMATION OF BASE STATION

TECHNICAL FIELD

The present invention relates to a method for broadcasting and a method for receiving location information of a base station.

BACKGROUND ART

Various internet protocol (IP)-based wireless packet access networks exist at the same time, such that a next-generation wireless network will be evolved to a type having an overlapped service area.

The multiple wireless network systems have different characteristics, and service areas of the wireless networks that interwork with each other are hierarchically overlapped to allow a service subscriber to access an optimum network depending on a position, a radio wave environment, a service characteristic, and a subscriber's preference.

In the multiple wireless networks, in order to provide optimum performance and a seamless service to the service subscriber, it is very important to support inter-RAT handover that converts a connection path of a service that is progressed by the optimum wireless network depending on the position and the radio wave environment of a multi-mode mobile station.

In order to support the inter-RAT handover, a process in which the station detects wireless networks that are serviceable at a current position of the station by recognizing not the radio wave environment of the network that is serviced but a radio wave environment of another network should first occur.

Further, the serviceable wireless networks should be rapidly detected in order to provide a broadband data transmission rate to a station having high-speed mobility and power efficiency.

The multi-mode station for supporting the multiple wireless networks includes modem modules for each wireless connection technology and power consumption increases or it is difficult to rapidly detect the wireless network depending on an operation mechanism for activating multiple modems at the time of detecting the wireless network.

A basic method for detecting the wireless network measures the intensity of a signal received from the wireless networks by continuously activating a plurality of wireless connection interfaces in the multi-mode station, and remarkably increases the power of the multi-mode station in an area where the wireless network cannot be accessed. Accordingly, a method of periodically activating the plurality of wireless connection interfaces in the multi-mode station is proposed, but opposed influences are given to rapidity of the network detection and efficient power usage depending on activation cycle of the wireless connection interface. That is, when the activation cycle of the wireless connection interface is set to be shorter, the network can be rapidly detected but the power consumption of the multi-mode station increases, and when the activation cycle of the wireless connection interface is set to be longer, the power consumption of the multi-mode station can be decreased but it is difficult to rapidly detect the network.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for broadcasting and a method for receiving location information of a base station which can reduce power consumption of a multi-mode station and rapidly detect a wireless network.

Solution to Problem

An exemplary embodiment of the present invention provides a method for broadcasting location information of a base station. The method for broadcasting location information of a base station includes: broadcasting a primary location-based service advertisement message including the location information of the base station; and broadcasting a first secondary location-based service advertisement message including location information of at least one base station belonging to a second network other than a first network to which the base station belongs with different timing from the primary location-based service advertisement message.

Another embodiment of the present invention provides a method for receiving location information of a base station in a terminal. The method for receiving location information of a base station includes: receiving a primary location-based service advertisement message including location information of a first base station from the first base station belonging to a first network in which the terminal is positioned; and receiving at least one secondary location-based service advertisement message of a plurality of secondary location-based service advertisement messages which are broadcasted with different timing from the primary location-based service advertisement message from the first base station, wherein the plurality of secondary location-based service advertisement messages correspond to a plurality of second networks, respectively, each secondary location-based service advertisement message includes location information of at least one base station belonging to the corresponding second network, and the at least one secondary location-based service advertisement message corresponds to the second network that the terminal can access among the plurality of second networks.

Yet another embodiment of the present invention provides a method for broadcasting location information of a base station. The method for broadcasting location information of a base station includes: broadcasting a primary location-based service advertisement message including the location information of the base station; and broadcasting a plurality of secondary location-based service advertisement messages with different timing after broadcasting the primary location-based service advertisement message, wherein the plurality of secondary location-based service advertisement messages correspond to a plurality of second networks, respectively, other than a first network to which the base station belongs, and each secondary location-based service advertisement message includes location information of at least one base station belonging to the corresponding second network.

Advantageous Effects of Invention

According to an embodiment of the present invention, since it is possible to reduce power consumption of a multi-mode station and rapidly detect a wireless network, and it is possible to prevent the multi-mode station from unnecessarily receiving a position-based service notification message, it is possible to reduce a reception load of the position-based service notification message.

BRIEF DESCRIPTION OF DRAWINGS

FIG. 4 is a flowchart illustrating a method for broadcasting location information of base stations that belong to a plurality of wireless networks according to an embodiment of the present invention.

MODE FOR THE INVENTION

Figure 1:
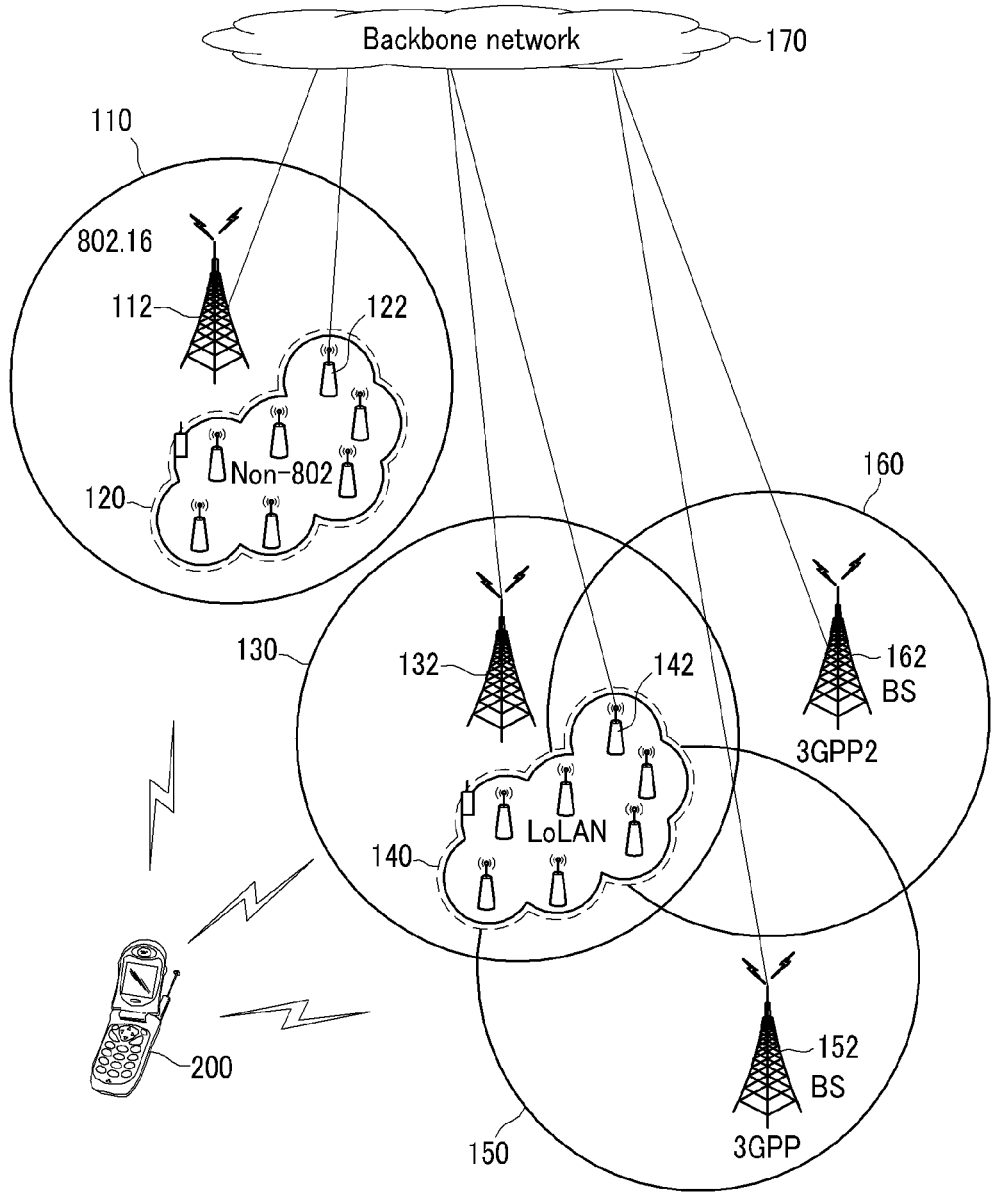
FIG. 1 is a schematic diagram illustrating a structure of a multiple wireless network system adopting the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising" will be understood to imply the inclusion of stated elements but not the exclusion of any other elements.

In this specification, a base station (BS) may designate an access point (AP), a radio access station (RAS), a node-B, an evolved node-B (eNB), a base transceiver station (BTS), a mobile multihop relay (MMR)-BS, etc., and may include functions of all or a part of the AP, RAS, node-B, eNB, the BTS, and the MMR-BS.

Hereinafter, a method for broadcasting and a method for receiving location information of a base station according to an embodiment of the present invention will be described in detail with reference to the accompanying drawings.

FIG. 1 is a schematic diagram illustrating a structure of a multiple wireless network system adopting the present invention.

Referring to FIG. 1, the multiple wireless network system includes a plurality of wireless networks 110 to 160 that have different characteristics and interwork with each other, a backbone network 170, and a multi-mode mobile station (hereinafter referred to as "MS") 200 that performs wireless communication by using the plurality of wireless networks 110 to 160.

The plurality of wireless networks 110 to 160 are connected to each other through the backbone network 170, and the wireless networks 110 to 160 are adjacent to each other or overlapped with each other. In FIG. 1, as the plurality of wireless networks, an IEEE 802.16 network 110, an IEEE 802.16e-based network 130, wireless LANs 120 and 140, a 3GPP-based network 150, and a 3GPP2-based network 160 are illustrated, and the IEEE 802.16 network 110 has a wider coverage than the wireless LAN 120 and includes the coverage of the wireless LAN 120. The IEEE 802.16e-based network 130, the 3GPP-based network 150, and the 3GPP2-based network 160 are adjacent to the IEEE 802.16 network 110 and overlapped with each other. At this time the IEEE 802.16e-based network 130 has a wider coverage than the wireless LAN 140, and includes coverage of the wireless LAN 140.

Each of base stations 112 to 162 of the wireless networks 110 to 160 collects information on base stations adjacent to each base station through the backbone network 170 connecting the base stations, and transmits the collected information to all the MSs 200 that belong to the base station itself through a neighbor BS advertisement function in a broadcasting pattern.

The MS 200 selects and accesses an optimum wireless network depending on the position, radio wave environment, service characteristics, and user's preference in the multiple wireless network environment. For this, the MS 200 includes a plurality of wireless interface modules (not shown) that provide access capability to the plurality of wireless networks 110 to 160 and communicates with the base stations 112 to 162 of the wireless networks 110 to 160 by using the plurality of wireless interface modules. At this time, the MS 200 may be mounted with the plurality of wireless interface modules (not shown) at the same time, or the MS 200 may be configured by a software defined radio-based reconfigurable system.

In FIG. 1, it is assumed that the MS 200 is positioned on the IEEE 802.16 network 110. Therefore, the IEEE 802.16 network 110 is referred to as a "serving wireless network", since the IEEE 802.16 network 110 and the wireless LAN 120 are overlapped with each other, the wireless LAN 120 is referred to as an "overlapped wireless network", and the remaining wireless networks 120 to 160 are referred to as "adjacent wireless networks". At this time, a base station that has jurisdiction over an area where the MS 200 of the base station belonging to the IEEE 802.16 network 110 is positioned is referred to as "serving base station".

Further, the MS 200 is provided with continuity of an IP-based wireless packet access by moving a wireless contact point within the same wireless network or on heterogeneous wireless networks depending on a received radio wave environment while moving. At this time, the MS 200 performs inter-RAT handover so as to access an optimum wireless network depending on the position and the received radio wave environment. In order to implement the inter-RAT handover, steps shown in FIG. 2 should be previously performed in sequence so as to access a new wireless network before the handover procedure.

Figure 2:
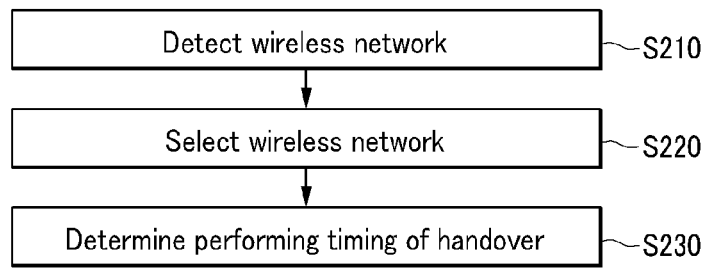
FIG. 2 is a diagram illustrating a step that should precede connection to a new wireless network according to an embodiment of the present invention.

FIG. 2 is a diagram illustrating a step that should be previously performed for connection to a new wireless network according to an embodiment of the present invention.

Referring to FIG. 2, the MS 200 detects all wireless networks accessible at a current position (S210). Radio wave environments of the accessible wireless networks are detected by appropriately activating a wireless interface module (not shown) of the MS 200.

The MS 200 detects all the accessible networks and selects one wireless network (S220). At this time, in order to select the optimum wireless network, a service type of the MS 200 that is currently progressed, data transmission rate, user's preference, charge, power consumption, and a service load of each wireless network, etc. can be considered. Meanwhile, one wireless network may be selected by the serving base station 112 that has jurisdiction over the area where the MS 200 is positioned among the serving base stations belonging to the IEEE 802.16 network 110.

When the MS 200 selects the optimum wireless network among the accessible wireless networks, timing when the handover is actually performed between the wireless networks is determined (S230). The timing when the handover is performed between the wireless networks is determined so as to not generate a ping-pong effect in consideration of a movement speed of the MS 200, a movement pattern, a service radius of a wireless network to be newly accessed, etc.

Figure 3:
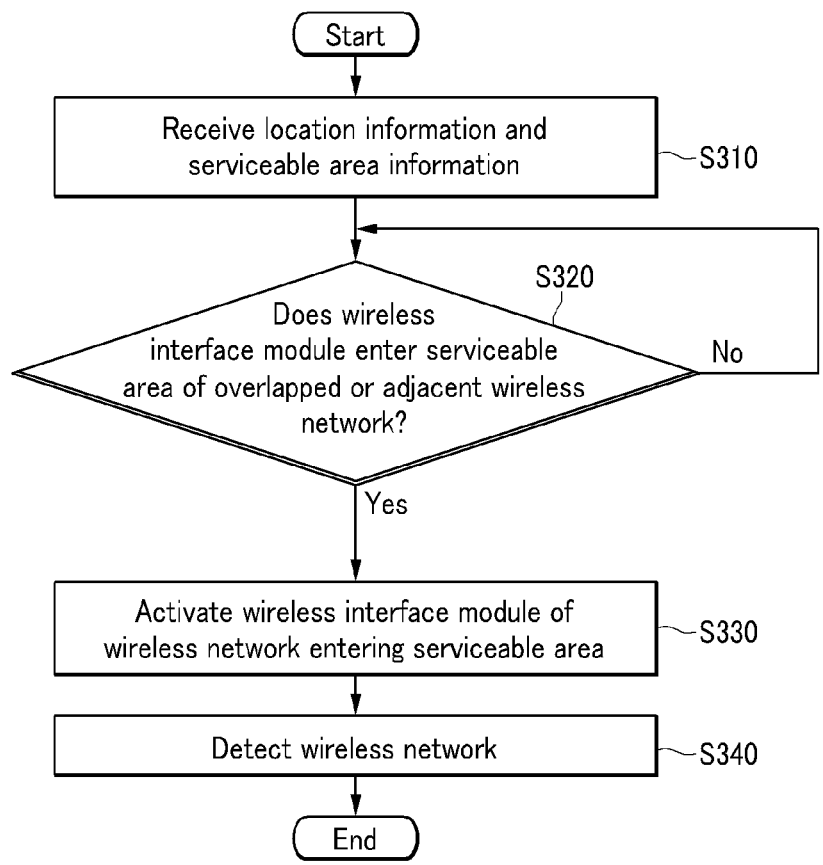
FIG. 3 is a flowchart illustrating a method for detecting a wireless network in a multiple wireless network system according to an embodiment of the present invention.

FIG. 3 is a flowchart illustrating a method for detecting a wireless network in a multiple wireless network system according to an embodiment of the present invention.

Referring to FIG. 3, the MS 200 receives location information of the base stations 112 to 162 belonging to the serving, overlapped, and adjacent networks 110 to 160, and serviceable area information that are broadcasted from the serving base station 112 that has jurisdiction over the area where the MS 200 is positioned (S310)

At this time, the base stations 112 to 162 belonging to the serving, overlapped, and adjacent networks 110 to 160 share a geo-location map for each of the base stations 112 to 162.

The MS 200 continuously compares its own position with the serviceable area information of each of the base stations 112 to 162 to determine whether or not its own position enters the serviceable area of the serving wireless network 110 but the overlapped or adjacent wireless networks 120 to 160 (S320).

When the MS 200 enters the serviceable area of the overlapped or adjacent wireless networks 120 to 160, a wireless interface module (not shown) of the corresponding wireless network is activated (S330) and the wireless network is detected through scanning (S340).

That is, only when the MS 200 enters the serviceable area of the overlapped or adjacent wireless networks 120 to 160, the wireless interface module (not shown) of the corresponding wireless network for detecting a received signal is activated and an activation cycle of the wireless interface module (not shown) is set to be shorter, such that it is possible to rapidly detect an accessible wireless network while preventing unnecessary power consumption of the MS 200.

FIG. 4 is a flowchart illustrating a method for broadcasting location information of base stations belonging to a plurality of wireless networks according to an embodiment of the present invention.

Referring to FIG. 4, the serving base station 112 broadcasts a primary location-based service advertisement message (primary-LBS-ADV_message) (hereinafter referred to as "LBS-ADV message") at a predetermined transmission cycle (S410).

Further, the serving base station 112 broadcasts a neighboring advertisement message (NBR-ADV_Message) including the serviceable area information of the base station belonging to the serving wireless network 110 (S420).

Referring to Table 1, the primary LBS-ADV message (Primary-LBS-ADV_Message) can include a message length (Length), the number (Number_of_BS) of base stations belonging to the serving wireless network 110, identification information (BSID) of each base station belonging to the serving wireless network 110, location information TLV (Type/Length/Value) on each base station belonging to the serving wireless network 110, the number (Number_of_NET) of adjacent and overlapped wireless networks, identification information (NETID) of the adjacent and overlapped wireless networks, broadcasting time interval information (Interval_Offset) of secondary LBS-ADV messages to be transmitted for each of the adjacent and overlapped wireless networks, etc. At this time, the location information TLV on each base station belonging to the serving wireless network 110 may include an absolute position TLV, a relative position TLV, a GPS time TLV, and a frequency accuracy TLV.

TABLE 1

| Text | Contents |
|---|---|
| Primary-LBS-ADV_Message_Format( ) { | |
| Management message type = xx | |
| Length | Entire length of message |
| Number_of_BS | Number of base stations |
| for(j = 0; j < Number_of_BS; j++) { | |
| Length | Length of message in FOR LOOP |
| BSID | Index of base station |
| Absolute Position TLV | Location information TLV |
| Relative Position TLV | Location information TLV |
| GPS Time TLV | Location information TLV |
| Frequency Accuracy TLV | Location information TLV |
| } | |
| Number_of_NET | Number of heterogeneous wireless networks |
| For(j = 0; j < Number_of_NET; j++) { | |
| Length | Length of message in FOR LOOP |
| NETID | Index of heterogeneous wireless network |
| Interval_Offset | Secondary-LBS-ADV broadcasting time interval information |
| } | |
| } | |

The MS 200 acquires the broadcasting time interval information (Interval_Offset) on the secondary LBS-ADV message (Secondary-LBS-ADV_Message) including the location information of the serving base station 112 and the location information of the base stations belonging to the accessible wireless network from the received primary LBS-ADV message (Primary-LBS-ADV_Message) (S430).

Meanwhile, the serving base station 112 transmits the primary LBS-ADV message (Primary-LBS-ADV_Message) to the MS 200 and separates the location information of the base stations belonging to the overlapped and adjacent wireless networks 120 to 160 for each wireless network (S440).

The serving base station 112 broadcasts a plurality of secondary LBS-ADV messages [Secondary-LBS-ADV_Message(3GPP), Secondary-LBS-ADV_Message(3GPP2), . . . ] including location information of the base stations 122 to 162 belonging to the overlapped and adjacent wireless networks 120 to 160 that are separated for each wireless network in accordance with the corresponding broadcasting time interval information [Interval_offset(3GPP), Interval_offset(3GPP2)] (S450 to S460).

Referring to Table 2, the secondary LBS-ADV message (Secondary-LBS-ADV_Message) may include the message length (Length), the identification information (NETID) of the wireless network, the number (Number_of_BS) of base stations belonging to each wireless network, identification information (BSID) of each base station belonging to each wireless network, location information TLV (Type/Length/Value) on each base station belonging to each wireless network, etc.

TABLE 2

| Text | Contents |
|---|---|
| Secondary-LBS-ADV_Message_Format( ) { | |
| Management message type = yy | |
| Length | Entire length of message |
| NETID | Index of wireless network |
| Number_of_BSID | Number of base stations |
| for(j = 0; j < Number_of_BS; j++) { | |
| Length | Length of message in FOR LOOP |
| BSID | Index of base station |
| Absolute Position TLV | Location information TLV |
| Relative Position TLV | Location information TLV |
| GPS Time TLV | Location information TLV |
| Frequency Accuracy TLV | Location information TLV |
| } | |
| } | |

Meanwhile, when the serving base station 112 broadcasts the secondary LBS-ADV messages [Secondary-LBS-ADV_Message(3GPP), Secondary-LBS-ADV_Message(3GPP2), . . . ] to the MS 200, the neighboring broadcasting message (NBR-ADV_Message) can be broadcasted, which includes the serviceable area information of the base stations 122 to 162 belonging to the overlapped and adjacent wireless networks 120 to 160 at a different time from the broadcasting time.

As such, when the serving base station 112 broadcasts the secondary LBS-ADV messages [Secondary-LBS-ADV_Message(3GPP), Secondary-LBS-ADV_Message(3GPP2), . . . ] at the time corresponding to the broadcasting time interval information [Interval_offset(3GPP), Interval_offset(3GPP2)], the MS 200 receives only the secondary LBS-ADV message including the location information of the base station belonging to the accessible wireless network at the time corresponding to the broadcasting time interval information [Interval_offset(3GPP2)] with respect to the accessible wireless networks acquired through the primary LBS-ADV message (Primary-LBS-ADV_Message) (S470 to S480).

For example, in the case when the wireless network that the MS 200 can access is the 3GPP2-based network 160, the serving base station 112 transmits the secondary LBS-ADV messages [Secondary-LBS-ADV_Message(3GPP), Secondary-LBS-ADV_Message(3GPP2), . . . ] including the location information of the base station belonging to the 3GPP-based network 150 and the 3GPP2-based network 160, respectively, in accordance with the broadcasting interval offset information, the MS 200 receives only the corresponding secondary LBS-ADV message [Secondary-LBS-ADV_Message(3GPP2)] in accordance with the broadcasting time interval information of the secondary LBS-ADV message including the location information of the base station positioned in the 3GPP2-based network 160 (S480) without receiving the secondary LBS-ADV message [Secondary-LBS-ADV_Message(3GPP)] including the location information of the base station belonging to the 3GPP-based network 150 (S470).

By this configuration, since the MS 200 can receive only the location information of the base station belonging to the wireless network that the MS 200 can access, it is possible to remarkably reduce a reception load of the MS 200.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for broadcasting location information of a base station, the method comprising:
   broadcasting a primary location-based service advertisement message including the location information of the base station and timing information for at least one secondary location-based service advertisement message; and
   broadcasting a first secondary location-based service advertisement message including location information of at least one base station belonging to a second network other than a first network to which the base station belongs with different timing from the primary location-based service advertisement message, according to the timing information included in the primary location-based service advertisement message,
   wherein the timing information included in the primary location-based service advertisement message includes broadcasting time interval information between the primary location-based service advertisement message and the first secondary location-based service advertisement message.

2. The method of claim 1, wherein the primary location-based service advertisement message further includes identification information of the second network.

3. The method of claim 1, further comprising broadcasting a second secondary location-based service advertisement message including location information of at least one base station belonging to a third network other than the second network with different timing from the primary location-based service advertisement message and the first secondary location-based service advertisement message.

4. The method of claim 1, wherein the primary location-based service advertisement message further includes location information of at least one second base station belonging to the first network other than the base station.

5. A method for receiving location information of a base station in a terminal, the method comprising:
   receiving a primary location-based service advertisement message including location information of a first base station from the first base station belonging to a first network in which the terminal is positioned and timing information for at least one secondary location-based service advertisement message; and
   receiving at least one secondary location-based service advertisement message of a plurality of secondary location-based service advertisement messages that are broadcasted with different timing from the primary location-based service advertisement message from the first base station, according to the timing information included in the primary location-based service advertisement message,
   wherein the plurality of secondary location-based service advertisement messages correspond to a plurality of second networks, respectively,
   wherein each secondary location-based service advertisement message includes location information of at least one base station belonging to the corresponding second network,
   wherein the at least one secondary location-based service advertisement message corresponds to the second network that the terminal can access among the plurality of second networks, and
   wherein the timing information included in the primary location-based service advertisement message includes broadcasting time interval information between the primary location-based service advertisement message and a first secondary location-based service advertisement message.

6. The method of claim 5, wherein the timing information included in the primary location-based service advertisement message includes broadcasting time interval information of the plurality of secondary location-based service advertisement messages; and the plurality of secondary location-based service advertisement messages are broadcasted with different timing in accordance with the broadcasting time interval information.

7. The method of claim 6, wherein the primary location-based service advertisement message further includes identification information of the plurality of second networks.

8. The method of claim 7, wherein the primary location-based service advertisement message further includes information on the number of the plurality of second networks.

9. The method of claim 5, wherein the primary location-based service advertisement message further includes location information of at least one second base station belonging to the first network other than the first base station.

10. A method for broadcasting location information of a base station, the method comprising:
    broadcasting a primary location-based service advertisement message including the location information of the base station and timing information for each of a plurality of secondary location-based service advertisement messages; and
    broadcasting the plurality of secondary location-based service advertisement messages with different timing after broadcasting the primary location-based service advertisement message according to the timing information included in the primary location-based service advertisement message,
    wherein the plurality of secondary location-based service advertisement messages correspond to a plurality of second networks, respectively, other than a first network to which the base station belongs,
    wherein each secondary location-based service advertisement message includes location information of at least one base station belonging to the corresponding second network, and
    wherein the timing information included in the primary location-based service advertisement message includes broadcasting time interval information between the primary location-based service advertisement message and a first secondary location-based service advertisement message.

11. The method of claim 10, wherein the timing information included in the primary location-based service advertisement message includes broadcasting time interval information of the plurality of secondary location-based service advertisement messages; and
    wherein the plurality of secondary location-based service advertisement messages are broadcasted with different timing in accordance with the broadcasting time interval information.

12. The method of claim 11, wherein the primary location-based service advertisement message further includes identification information of the plurality of second networks.

13. The method of claim 12, wherein the primary location-based service advertisement message further includes information on the number of the plurality of second networks.

14. The method of claim 10, wherein the primary location-based service advertisement message further includes location information of at least one second base station belonging to the first network other than the base station.

* * * * *